United States Patent [19]
Goldin

[11] Patent Number: 6,048,207
[45] Date of Patent: Apr. 11, 2000

[54] CARRIER FOR WRITING NUMERICAL SYMBOLS

[76] Inventor: Fima Goldin, 1924 W. 6th St., Apt. #2, Brooklyn, N.Y. 11223

[21] Appl. No.: 09/295,576

[22] Filed: Apr. 22, 1999

[51] Int. Cl.[7] .................................................. G09B 11/04
[52] U.S. Cl. ............................................. 434/163; 434/162
[58] Field of Search .................................. 434/87, 88, 90, 434/162, 163, 164; 33/1 B

[56] References Cited

U.S. PATENT DOCUMENTS

| | | | |
|---|---|---|---|
| 602,222 | 4/1898 | Kimble . | |
| 1,695,423 | 12/1928 | Gyllenberg et al. | 33/1 B |
| 2,090,186 | 8/1937 | Corbett | 434/87 |
| 2,942,973 | 6/1960 | Patrick | 33/1 B |
| 3,363,338 | 1/1968 | Skinner et al. | 434/162 |
| 3,638,335 | 2/1972 | Gundersen et al. | 434/162 |
| 3,733,468 | 5/1973 | Eberly . | |
| 4,672,759 | 6/1987 | Docherty . | |
| 4,838,792 | 6/1989 | Hoyeck . | |
| 4,878,844 | 11/1989 | Gasper et al. | 434/88 |
| 5,263,862 | 11/1993 | Claytor | 434/88 |
| 5,484,288 | 1/1996 | DelGigante | 434/163 |

*Primary Examiner*—Sam Rimell
*Attorney, Agent, or Firm*—I. Zborovsky

[57] ABSTRACT

A carrier for writing symbols, such as numerals and the like, comprising a base, and a plurality of designated areas each formed by a plurality of individual elements, each of the areas being marked by indicating of corresponding individual elements so as to provide identical numerals and the like regardless of handwriting of an individual.

6 Claims, 2 Drawing Sheets

CARRIER FOR WRITING NUMERICAL SYMBOLS

BACKGROUND OF THE INVENTION

The present invention relates to a carrier for writing numerical symbols.

It is known that people have their own handwriting and it is very difficult in many instances to recognize their handwriting, especially numerical symbols used for example for addresses on envelopes, on forms for official business, etc. A carrier for writing numerical symbols is known, which includes for example a sheet of paper with a plurality of squares. Each numeral can be written in each square, so that a plurality of squares can provide the complete number, such as for a street address, a zip code, etc. However, the squares, while providing a sufficient limitation of the outer contour of numerals, does not ensure a uniform writing of the numerals inside the boxes.

SUMMARY OF THE INVENTION

It is therefore an object of the present invention to provide a carrier for writing which is a further improvement of the existing carriers for writing.

In keeping with these objects and with others which will become apparent hereinafter, one feature of present invention resides, briefly stated, in a carrier for writing which has a plurality of individual elements which are arranged adjacent to one another so as to define a predetermined area in which corresponding symbols can be written substantially uniformly by different individuals.

In accordance with one embodiment of the present invention, the element form a matrix which includes nine such elements, and a numerical symbol is selected so that for example symbol 1 only one element is indicated for example blackened, for a numeral two, two numerals are indicated, for a numeral three, three elements are indicated and so on and so forth. Therefore, regardless of handwriting of the individuals, it is easy to recognize the numerals which are provided on such a carrier.

In accordance with another feature of the present invention, the elements are formed so that a plurality of areas each designated for writing of a corresponding numeral, each area is composed of two squares arranged one on the other so as to form a vertical extending rectangle, and also each area is limited by for a contour of the rectangle and each of the squares.

In accordance with still another feature of present invention, at least one of the squares of each rectangle can be provided with an inclined line. When the carrier is designed in accordance with present invention, it is easier to write reference numerals into each designated area, or in other words into each rectangle a symbol can be written by lines along at least a portion of the contour of each rectangle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
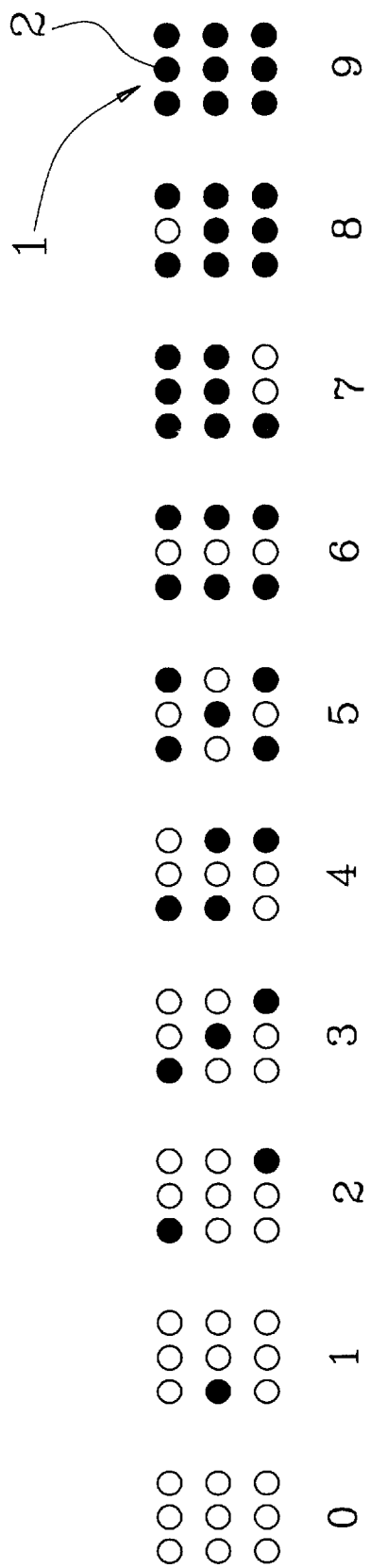
FIG. 1 is a view showing a carrier for writing in accordance with the first embodiment of the present invention.

A carrier in accordance with the present invention includes a base formed for example of paper, plastic, etc. A carrier is provided with a plurality of elements which are identified with reference numeral 1. The elements can be formed as circular dots. The elements are arranged in several groups, for example 10 groups identified with reference numeral 2. Each group has 9 elements 1. The writing on the carrier in accordance with the present invention can be performed in the following manner. When numeral 0 has to be identified, no elements are identified or blackened. For identifying reference numeral 1, one element is blackened, for identifying reference numeral 2, two elements are blackened, for identifying reference numeral 3, three elements are blackened, etc as shown in FIG. 1. Therefore, regardless of any individual handwriting of a person, it is always possible to immediately recognize the reference numerals identified in the corresponding group, so that any errors are avoided.

FIG. 1 shows the carrier provided with the elements 1 formed by circle. It will be understood that the elements can have different shape, as shown in FIGS. 2a–2h. In particular, the elements shown in FIGS. 2a–2g have the shape of a vertical rectangle, a vertical ellipse, a multi-corner, a rhombus, a horizontal rectangle, a triangle, a horizontal ellipse.

In FIG. 2h the elements are formed as circles. Here however the identification of a numeral is performed not by blackening of a corresponding number of the elements, but instead by blackening of an element which in a numerical order corresponds to the required numeral. For example, in FIG. 2h the fifth element is blackened, which means that the numeral 5 is coded. The elements in FIG. 2h are also numbered.

Figure 3:
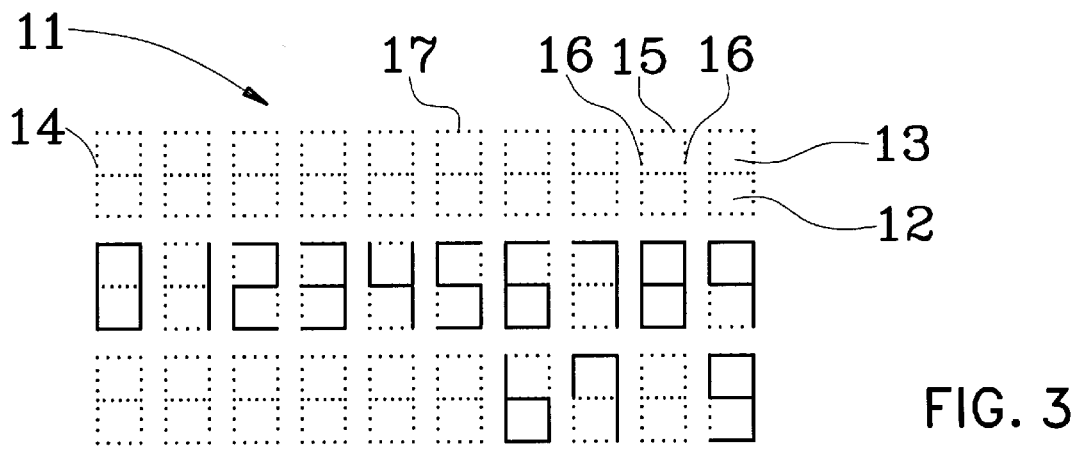
FIG. 3 is a view showing a carrier for writing in accordance with the second embodiment of the present invention.

In carrier in accordance with another embodiment of the present invention is shown in FIG. 3. Here, a plurality of designated areas identified with reference numeral 11 are provided on the carrier. Each designated area 11 is formed by two squares 12 and 13 which together form a rectangle 14. The squares 12, 13 and the rectangle 11 itself are drawn by contour lines including three horizontal lines 15 separating the squares 12 and 13 from one another and also defining the upper and the lower limit of each rectangle, and two vertical lines 16, which define the sides of each rectangle. The lines 15 and 16 can be formed by a plurality of dots 17.

As can be seen from FIG. 3, this provides for a possibility to write reference numerals in a uniform fashion substantially identically, regardless of the handwriting of the individual. Each numeral can be formed by following of the corresponding lines 15 and/or 16 of the squares 12, 13 and the rectangle 14. The thusly drawn reference numerals do not have any inclined lines, but instead they have only straight lines.

Figure 4:
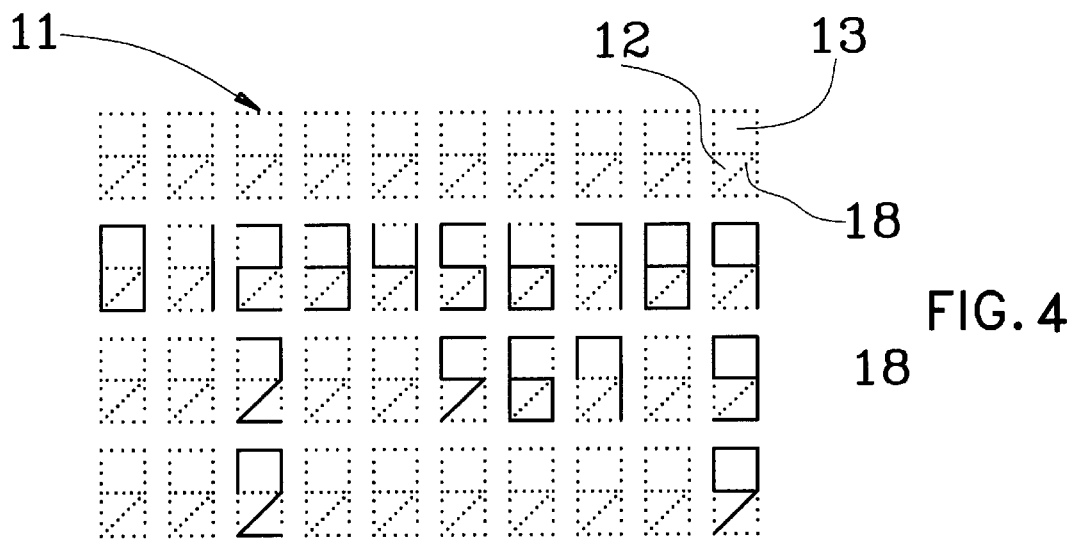
FIG. 4 is a view showing a carrier for writing in accordance with a third embodiment of the present invention.

The embodiment shown in FIG. 4 is different from the embodiment of FIG. 3 in that the lower square 12 is provided with an additional inclined line 18 extending diagonally in the lower square 12. In the carrier in accordance with this embodiment the reference numerals can be written with the use of straight vertical and/or horizontal lines and also the inclined lines along the lines 18 of the lower square 12.

The carrier in accordance with the embodiment of FIG. 4 substantially corresponds to the carrier of the embodiment of FIG. 3. The only difference is that the inclined line a in this embodiment is formed by a line extending diagonally in the upper square 13. Here also the numerals can be drawn not only by straight lines, but also by inclined lines in the upper squares of the carrier.

Figure 5:
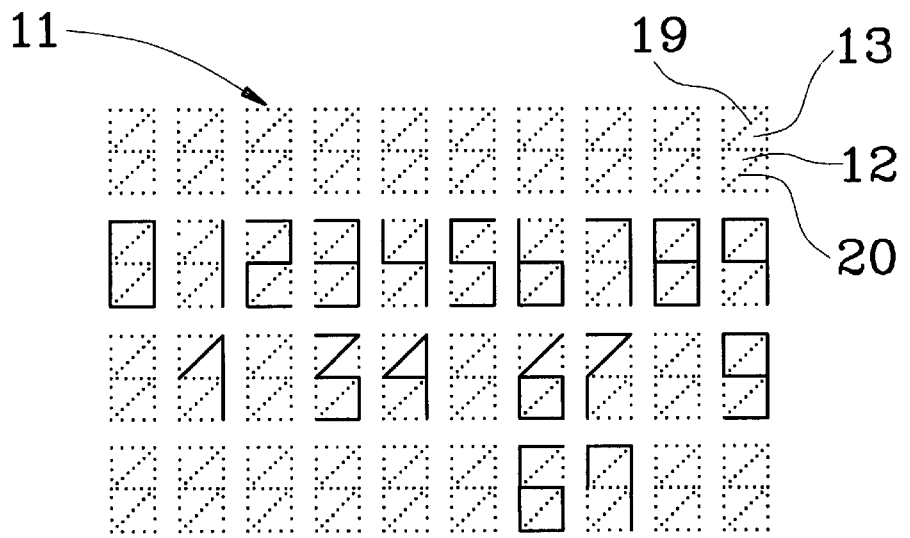
FIG. 5 is a view showing the carrier for writing in accordance with a fourth embodiment of the present invention.

The carrier in accordance with the embodiment of FIG. 5 has inclined lines 19 and 20 extending diagonally in the upper square and in the lower square. Therefore the numerals can be drawn not only by straight lines, but also by inclined lines in the upper and lower squares of the carrier.

Figure 2:
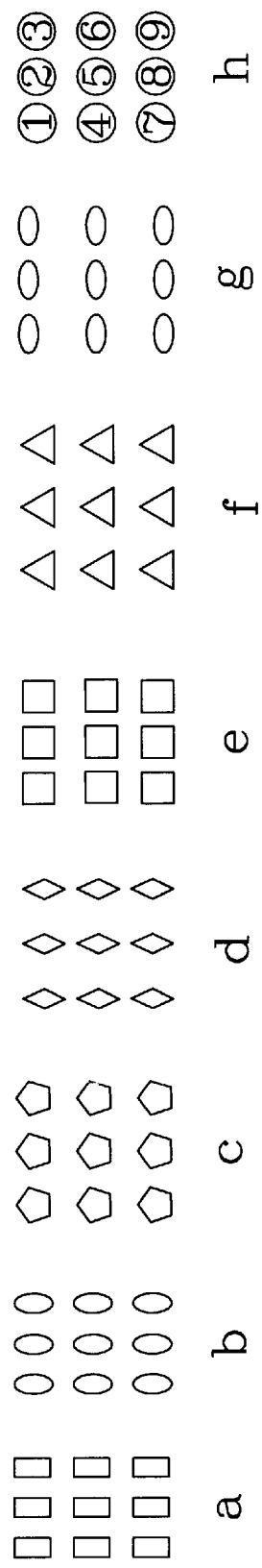
FIG. 2 is a view showing an indicator of FIG. 1 in accordance with a further modification.

As can be seen from FIGS. 1, 2 and 3 the numerals drawn with the use of the inventive carrier are substantially identical regardless of the handwriting of the individual people. Therefore, the numerals can be easily recognized visually, read by corresponding reading devices, scanned by scanners, etc.

It will be understood that each of the elements described above, or two or more together, may also find a useful application in other types of constructions differing from the types described above.

While the invention has been illustrated and described as embodied in carrier for writing numerical symbols, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A carrier for writing symbols, such as numerals and the like, comprising a base; and a plurality of designated areas each formed by a plurality of individual elements, each of said areas being marked by indicating of corresponding individual elements so as to provide identical numerals and the like regardless of handwriting of an individual, each of said designated areas being formed by two squares located one above the other so as to form a rectangle, said rectangles and said two squares of each of said rectangle having limiting outer contours, each of said outer contours of each of said designated area includes three horizontal lines identifying an upper and a lower limit of each of said rectangles, a separation line between said squares of each of said rectangles, and two vertical lines identifying lateral limits of each of said rectangles, and an inclined diagonal line extending diagonally in one of said squares of each of said rectangles.

2. A carrier as defined in claim 1, wherein each of said areas are numbered, and single corresponding area is marked to provide a corresponding numeral.

3. A carrier as defined in claim 1; and further comprising means for designating said outer contours and including a plurality of dots.

4. A carrier as defined in claim 1, wherein said diagonal line is provided in an upper square of each of said rectangles.

5. A carrier as defined in claim 1, wherein said diagonal line is provided in a lower square of each of said rectangles.

6. A carrier for writing symbols, such as numerals and the like, comprising a base; and a plurality of designated areas each formed by a plurality of individual elements, each of said areas being marked by indicating of corresponding individual elements so as to provide identical numerals and the like regardless of handwriting of an individual, each of said areas being formed by only nine elements, so that by indicating a corresponding number of the elements, a corresponding numeral is drawn.

\* \* \* \* \*